(12) United States Patent
Wingen et al.

(10) Patent No.: US 6,572,183 B2
(45) Date of Patent: Jun. 3, 2003

(54) OPENABLE MOTOR VEHICLE ROOF

(75) Inventors: Bernhard Wingen, Feldkirchen (DE); Wolfgang Seifert, Germering (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/953,437

(22) Filed: Sep. 17, 2001

(65) Prior Publication Data

US 2002/0163228 A1 Nov. 7, 2002

(30) Foreign Application Priority Data

Sep. 15, 2000 (DE) ......................................... 100 46 068

(51) Int. Cl.⁷ ............................................... B60J 7/047
(52) U.S. Cl. .................. 296/216.03; 296/223
(58) Field of Search ................. 296/216.02, 216.03, 296/223

(56) References Cited

U.S. PATENT DOCUMENTS 5,288,125 A    2/1994  Huyer
6,158,803 A *  12/2000 Reihl et al. ............. 296/223 X

FOREIGN PATENT DOCUMENTS

| DE | 35 04 573     | 8/1986  |
|----|---------------|---------|
| DE | 36 03 314     | 8/1987  |
| DE | 39 30 756     | 3/1991  |
| DE | 43 30 426     | 3/1995  |
| EP | 0 543 427     | 5/1993  |
| WO | WO 94/25301   | 11/1994 |
| WO | WO 00/06403   | 2/2000  |

* cited by examiner

*Primary Examiner*—Dennis H. Pedder
(74) *Attorney, Agent, or Firm*—Nixon Peabody LLP; David S. Safran

(57) ABSTRACT

An openable motor vehicle roof is provided which includes a cover which in the closed position closes at least part of the roof opening, a cover-mounted cover carrier which is provided with a first crank path, and a slide which can be moved in the lengthwise direction of the roof by means of a drive in a first roof-mounted guide channel. The front area of the cover is movably guided in a second roof-mounted guide channel. A first engagement element, positioned on the raising lever, engages the first crank path and a second engagement element, attached to the raising lever, is movably guided in a third roof-mounted guide channel to control a raising motion of a raising lever. The rear edge of the cover can be raised out of the closed position by moving the slide by means of the raising lever. The first crank path is shaped such that when the raising lever is not raised, the displacement of the first engagement element in the first crank path causes a raising motion of the cover.

20 Claims, 3 Drawing Sheets

OPENABLE MOTOR VEHICLE ROOF

TECHNICAL FIELD

This invention relates to an openable motor vehicle roof.

BACKGROUND

One conventional, generic motor vehicle roof is disclosed in DE 35 04 573 A1. A slide a raising lever can be moved forward, on the one hand, out of a closed position in order to raise the lever and thus the cover, and, on the other hand, can be moved to the rear in order likewise to raise the lever and thus the cover. In the latter case, at the same time, the cover is pushed to the rear by means of a second slide which is mounted in the area of the front end of the cover. When the first slide which is connected to the raising lever has reached its end position, it is automatically locked tight to the roof, while the displacement motion of the cover is continued by means of the second slide which is directly driven by a drive cable until the cover has reached its end position. In doing so, the first crank pin of the cover slides forward in the roof-mounted crank path which runs parallel to the cover, by which the cover continues to be raised during displacement. This construction disadvantageously requires two driven slides, specifically one for the front edge of the cover and one for the raising lever.

Published European Patent Application No. 543 427 B1 (U.S. Pat. No. 5,288,125) discloses a motor vehicle roof in which the raising lever for the cover is actuated by the roof-mounted crank pin being pushed in the crank path provided in the raising lever when the latter is being moved.

Published International Patent Application WO 00/06403 discloses a motor vehicle roof in which the raising lever can be moved on a slide which is provided with a crank path. The raising motion of the lever is achieved by the crank pin, provided on the lever, fitting into the crank path of the slide. Furthermore, a second crank pin of the raising lever fits into a cover-mounted crank path. The crank path is designed such that, when the raising lever is moved with respect to the cover, an additional raising motion is caused.

Published German Patent Application DE 43 30 426 A1 and published International Patent Application WO 94/25301 disclose motor vehicle roofs in which there is no raising lever, but only one slide which fits into a cover-mounted crank path which is shaped such that movement of the slide with respect to the cover causes a raising motion of the cover. The disadvantage is that, at a fixed maximum construction height for a relatively large given raising height, the crank path must be placed relatively near the front pivot resulting in minimal supporting action and major effects of tolerance. If this is to be prevented, on the other hand, the construction height should be great.

SUMMARY OF THE INVENTION

One object of the present invention is to overcome the disadvantages and shortcomings of the prior art.

The above object along with other objects are achieved by providing an openable motor vehicle roof, comprising at least one cover closing at least part of a roof opening in the closed position, a cover-mounted cover carrier provided with a first crank path, a slide movable in a lengthwise direction of the roof by means of a drive in a first roof-mounted guide channel, and a raising lever pivotally mounted on the slide, a front area of the cover being movably guided in a second roof-mounted guide channel in the lengthwise direction of the roof, wherein a first engagement element, positioned on the raising lever, engages the first crank path and a second engagement element, attached to the raising lever, is movably guided in a third roof-mounted guide channel in the lengthwise direction of the roof to control a raising motion of the raising lever, the cover being raised out of the closed position at its rear edge by moving the slide via the raising lever, the first crank path being shaped such that when the raising lever is not raised, the displacement of the first engagement element in the first crank path causes a raising motion of the cover. Advantageously, the raising action of the cover-mounted crank path and the third cover-mounted guide for the raising lever are added to one another, by which the construction height can be reduced with the same stability; or, with the same construction height, the stability of the support can be increased.

DETAILED DESCRIPTION OF THE INVENTION

Figure 1:
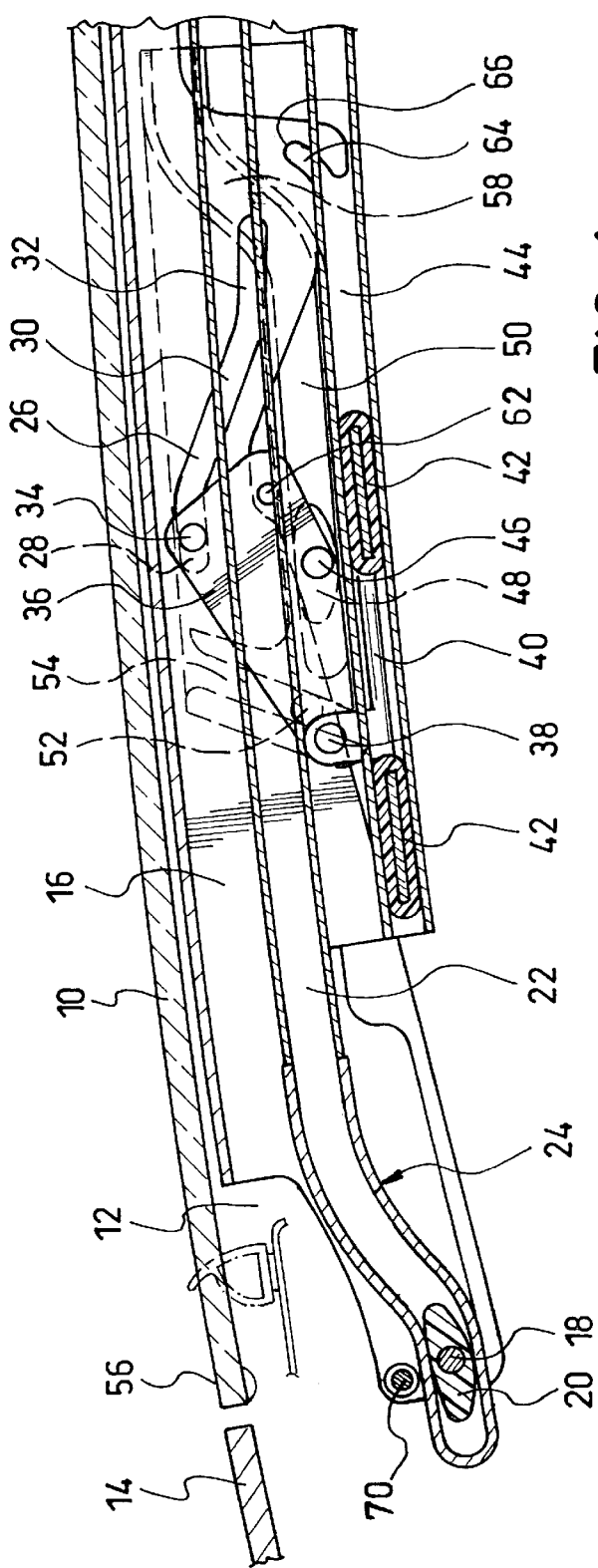
FIG. 1 shows a side view of a motor vehicle roof of the present invention with the cover closed.

FIG. 1 illustrates the present invention including a cover 10 in the closed position closing a roof opening 12 in a solid roof skin 14. On the cover 10, a cover carrier 16 is permanently mounted and it has on its front end a sliding block 20 which is supported to be able to swivel around an axis 18 and which is supported to be able to move in the lengthwise direction of the roof, guided in a guide channel 22 in the vertical direction. In the closed position shown in FIG. 1, the sliding block 20 is located on the front end of the guide channel 22 which is formed by an essentially horizontal section 24A (FIG. 2) which then passes to the rear first into an ascending section 24B and subsequently in turn into an essentially horizontal section. The front end, or starting area, of the guide channel 22, which is S-shaped overall, is made as an insert part 24 into the guide rail.

In its middle area, the cover carrier 16 is provided with a crank path 26 which has a horizontal front section 28, a middle section 30 which is uniformly tilted down and a horizontal lower section 32. A first engagement element, i.e. a crank pin, 34, formed on the raising lever 36, fits into crank path 26. The raising lever 36 is coupled to a slide 40 to be able to swivel around an axis 38. The slide 40 is movably supported in an essentially horizontally running, roof-mounted guide channel 44 in the lengthwise direction of the roof by means of two sliding blocks 42. Slide 40 is conventionally driven by means of a drive cable (not shown). A second engagement element, i.e. sliding block, 48, is attached to the raising lever 36 with the ability to swivel around an axis 46. Sliding block 48 is also supported to be able to move in the lengthwise direction of the roof guided in a guide channel 50 in the vertical direction. In the closed position shown in FIG. 1, the sliding block 48 of the lever 36 is located in the essentially horizontally running front area of the guide channel 50.

The cover carrier 16 is also provided with an engagement member, i.e. pin, 52 which, in the position shown in FIG. 1, fits into a very steeply running roof-mounted guide channel 54 and thus essentially prevents displacement of the cover carrier 16 in the lengthwise direction of the roof.

Proceeding from the closed position shown in FIG. 1, the slide 40 is moved to the rear. As a result of the steepness of the guide channel 54, only slight motion of the cover 10 to the rear takes place. However, the crank pin 34 of the lever 36 can move in the crank path 26 to the rear, by entering section 30, which is tilted down from the horizontal section 28, by which the cover 10 is lifted at its rear edge, i.e. raised.

Figure 2:
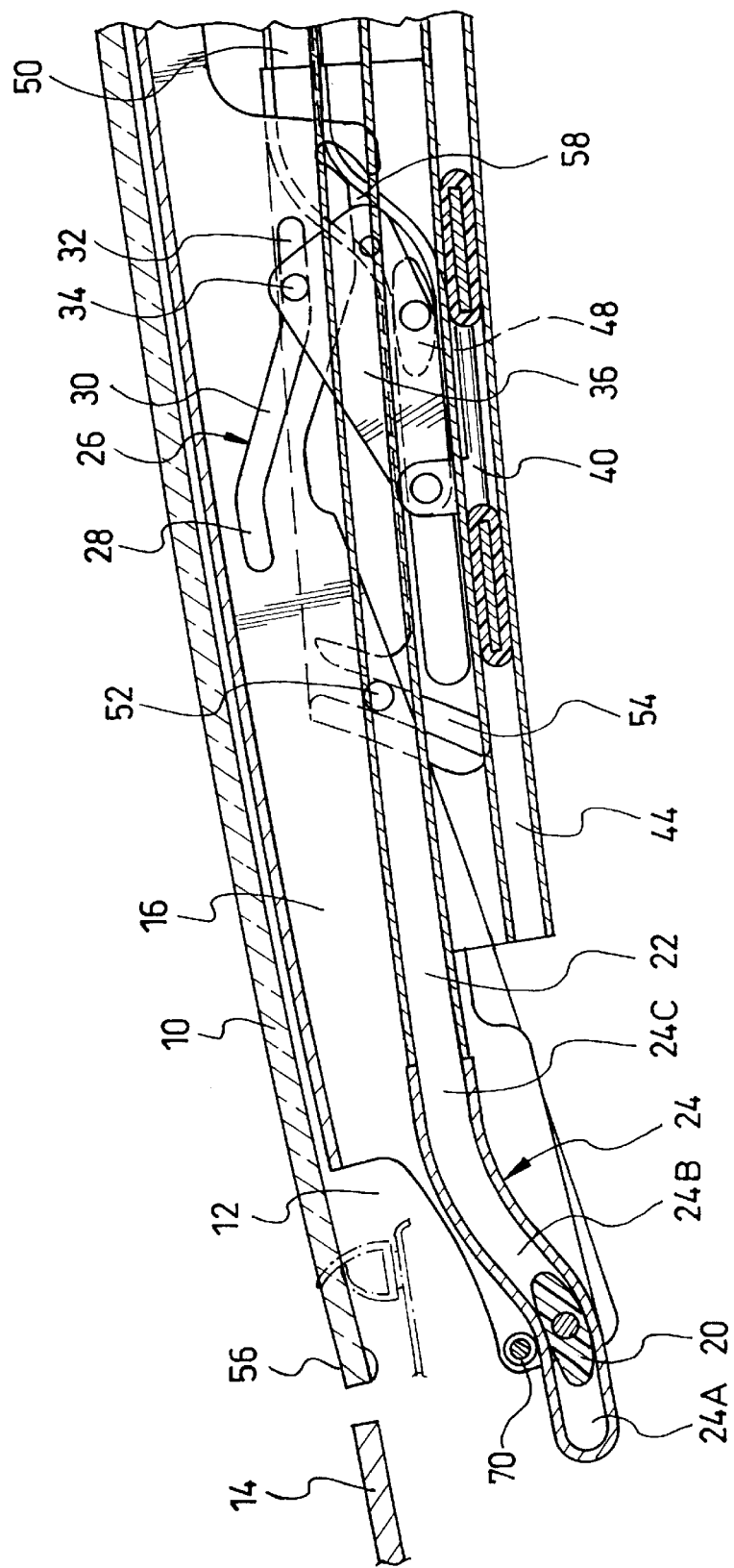
FIG. 2 shows a side view of the roof which is similar to FIG. 1, but with the cover partially raised.

FIG. 2 shows the intermediate position of the cover 10 in which the portion of the raising motion of the cover 10 caused by the tilt of the crank path 26 is essentially ended since the crank pin 34 has entered the horizontal rear end area 32 of the crank path 26. The pin 52 is still engaged with the steep guide channel 54. The front sliding block 20 has changed its position as shown in FIG. 2 only slightly relative to the position shown in FIG. 1 so that the front edge 56 of the cover assumes essentially the same position as in the closed position of FIG. 1. In the position shown in FIG. 2, the sliding block 48 of the raising lever 36 has reached the end of the horizontal initial section of the guide charnel 50 and is about to enter the ascending section 58 of the guide channel 50 in order to initiate the raising motion of the raising lever 36. It can be seen that a starting area of the guide channel 50 is essentially S-shaped.

Figure 3:
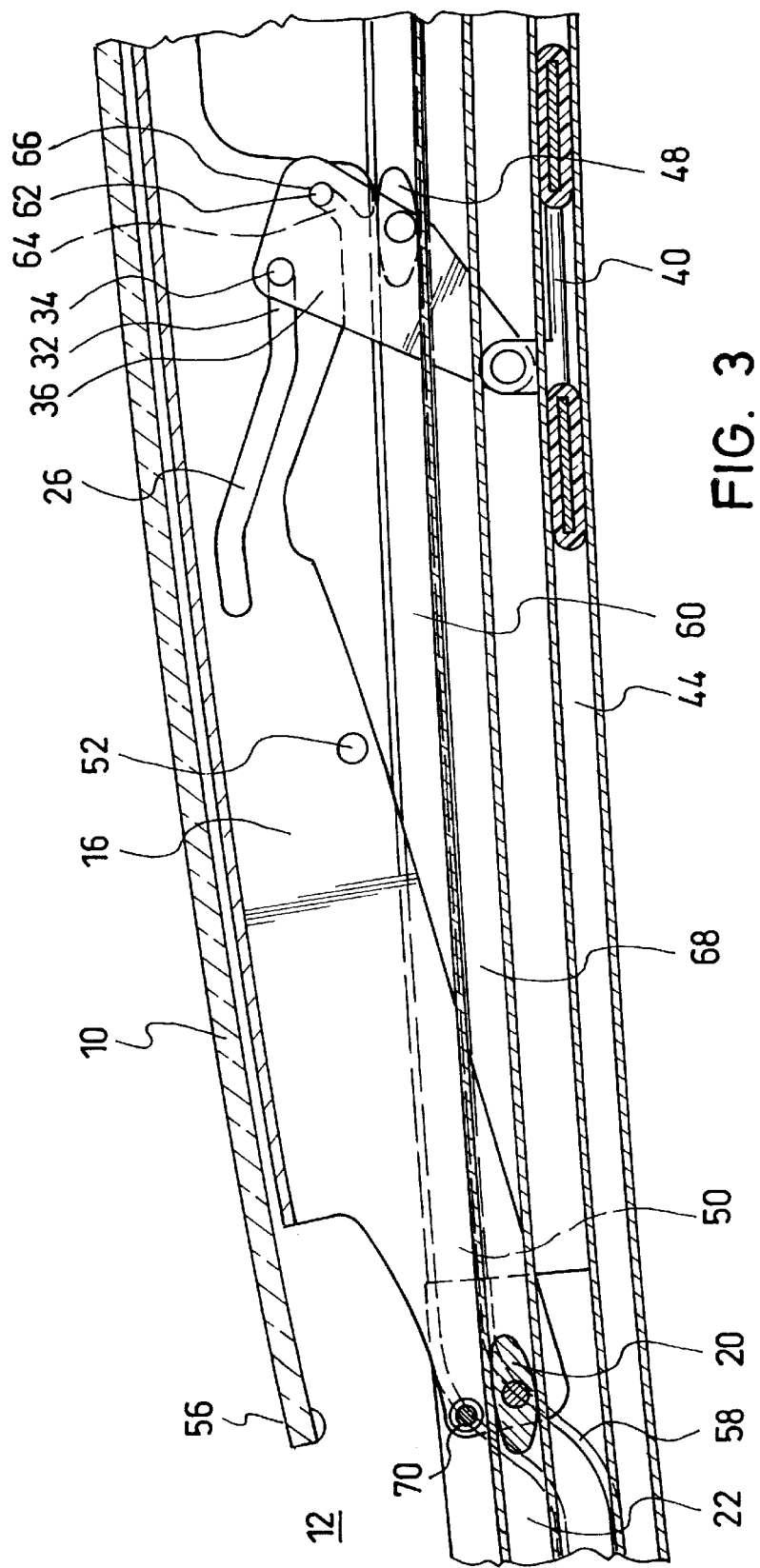
FIG. 3 shows a side view of the roof which is similar to FIG. 1, but with the cover completely raised and pushed back.

FIG. 3 shows the motor vehicle roof with the cover 10 fully raised and pushed to the rear. The raising lever 36 has traversed the ascending section 58 of the guide path 50 and is completely raised. The sliding block 48 of the raising lever 36 is guided in the section 60 of the guide channel 50 which runs essentially horizontally. The crank pin 34 of the raising lever 36 now adjoins the back end of the crank path 26 and in this way causes entrainment of the cover carrier 16 by the slide 40 to the rear. The raising of the lever 36 by the ascending section 58 of the guide channel 50 resulted in a third engagement element, i.e. crank pin 62, located on the raising lever 36, entering the second crank path 64 of the cover carrier 16, which path is open to the front, and adjoining its back end 66. The action, in cooperation with the guidance of the sliding block 48 in the vertical direction, causes entrainment, i.e. a frictional connection, of the cover carrier 16 also in the closing direction of the slide 40.

When the slide 40 is moved forward as the cover 10 is being closed, the cover carrier 16, and thus the cover 10, are pushed forward by the contact of the crank pin 62 with the end 66 of the crank path 64 until the crank pin 62 again disengages from the crank path 64. This disengagement occurs by the lowering of the raising lever 36 as the sliding block 48 enters the tilted section 58 of the guide channel 50 causing the crank pin 34 to slide forward into the crank path 26 and thus the lowering of the cover 10 further into the closed position.

In the position shown in FIG. 3, the front sliding block 20 has traversed the ascending area 24B of the guide channel 22, by which the front edge 56 of the cover has been raised, and is now pushed to the rear in the section 68 of the guide channel 22 which runs essentially horizontally. The displacement motion of the cover 10 to the rear becomes possible only when, by relatively dramatically raising the cover 10 and by the entry of the sliding block 48 into the ascending section 58 of the guide channel 50, the pin 52 emerges on the top open end of the guide channel 54 and is thus released. When the cover 10 is closed, the described motion for the pin 52 takes place in reverse.

The raising mechanism is designed such that when the pin 52 is released from the guide channel, the crank pin 62 engages the crank path 64 in order to block the raising lever 36 for displacement motion relative to the cover carrier 16. In this way, provision is always made for a defined position of the cover 10 in the lengthwise direction of the roof.

The cover 10 can be provided as a single cover or it can form the front cover of a double spoiler roof with the rear cover being made essentially analogous to the front cover. One important difference, however, is that the slide of the rear cover is not driven directly by the drive cable, but is moved by an automatically detachable coupling with the front slide which is driven by the drive cable. Coupling takes place only when the front cover has been completely raised and has already been pushed a distance to the rear. Until then, the rear cover remains in its closed position. Aside from the initial areas, the guide channels 22, 50 and 44 of the two covers can be used jointly. In this case, however, in the rear area from the horizontal section, a secondary path is branched downward from the guide channels 22 and 50 and reserved for the corresponding sliding elements of the rear cover. To prevent unwanted entry of the sliding blocks of the front cover into these secondary paths, either the sliding blocks of the front cover can be made correspondingly longer than those of the rear cover or, for example, as indicated in FIGS. 1 to 3 for the front sliding block 20, there can be an additional slider 70. Slider 70 adjoins the outside of the upper side wall in the branching area via a thickened area of the upper side wall of the guide channel 22 and thus guides the sliding block along the top side wall of the guide channel 22, thereby preventing unwanted entry of the sliding block 20 into the downwardly branching secondary path. Reliable entry of the corresponding sliding block of the rear cover can be ensured by the main path and the secondary path differing in their depth in the branching area and the sliding block of the front cover and the corresponding sliding block of the rear cover being made with a different width or depth. These mechanisms are detailed in German patent application 100 46 129.2 dated Sep. 15, 2000, the entire contents of which is hereby incorporated by reference in the disclosure contents of this application.

We claim:

1. An openable motor vehicle roof; comprising at least one cover closing at least part of a roof opening in the closed position, a cover-mounted cover carrier provided with a first crank path, a slide movable in a lengthwise direction of the roof by means of a drive in a first roof-mounted guide channel, and a raising lever pivotally mounted on the slide, a front area of the cover being movably guided in a second roof-mounted guide channel in the lengthwise direction of the roof, wherein a first engagement element, positioned on the raising lever, engages the first crank path and a second engagement element, attached to the raising lever, is movably guided in a third roof-mounted guide channel in the lengthwise direction of the roof to control a raising motion of the raising lever, the cover being raised out of the closed position at its rear edge by moving the slide via the raising lever, the first crank path being shaped such that, when the raising lever is not raised, the displacement of the first engagement element in the first crank path causes a raising motion of the cover.

2. The motor vehicle roof of claim 1, wherein a frictional connection is established between the cover carrier and the slide for displacement in the lengthwise direction of the roof when the cover is raised via the raising lever.

3. The motor vehicle roof of claim 2, wherein the frictional connection, with the cover raised in the opening direction, occurs by contact of the first engagement element with a rear section of the first crank path.

4. The motor vehicle roof of claim 2, wherein the frictional connection with the cover raised in the closing direction occurs by engagement of a third engagement element, positioned on the raising lever, with a second crank path formed on the cover carrier with the raising lever raised.

5. The motor vehicle roof as in claim 3, further including an engagement member positioned on the cover carrier to interact with a fourth roof-mounted guide channel such that displacement of the cover in the lengthwise direction of the roof is essentially prevented when the first engagement element does not lie on or near the rear section of the first crank path.

6. The motor vehicle roof of claim 3, wherein the third roof-mounted guide channel is designed such that the raising of the raising lever begins only when the first engagement element is located near the rear section of the first crank path.

7. The motor vehicle roof of claim 1, wherein a front section and a rear section of the first crank path runs essentially horizontally and is made essentially uniformly descending in an area which lies in between the front and rear sections.

8. The motor vehicle roof of claim 1, wherein the second roof-mounted guide channel is designed such that lifting of a front edge of the cover takes place from the closed position.

9. The motor vehicle roof of claim 8, wherein lifting of the front edge of the cover takes place only at the start of the raising motion of the raising lever.

10. The motor vehicle roof as in claim 1, wherein the second roof-mounted guide channel and the third roof-mounted guide channel are made essentially S-shaped in a respective starting area.

11. The motor vehicle roof of claim 3, wherein the frictional connection with the cover raised in the closing direction occurs by engagement of a third engagement element, positioned on the raising lever, with a second crank path formed on the cover carrier with the raising lever raised.

12. The motor vehicle roof as in claim 11, further including an engagement member positioned on the cover carrier to interact with a fourth roof-mounted guide channel such that displacement of the cover in the lengthwise direction of the roof is essentially prevented when the first engagement element does not lie on or near the rear section of the first crank path.

13. The motor vehicle roof as in claim 2, wherein the second roof-mounted guide channel and the third roof-mounted guide channel are made essentially S-shaped in a respective starting area.

14. The motor vehicle roof as in claim 3, wherein the second roof-mounted guide channel and the third roof-mounted guide channel are made essentially S-shaped in a respective starting area.

15. The motor vehicle roof as in claim 4, wherein the second roof-mounted guide channel and the third roof-mounted guide channel are made essentially S-shaped in a respective starting area.

16. The motor vehicle roof as in claim 5, wherein the second roof-mounted guide channel and the third roof-mounted guide channel are made essentially S-shaped in a respective starting area.

17. The motor vehicle roof as in claim 6, wherein the second roof-mounted guide channel and the third roof-mounted guide channel are made essentially S-shaped in a respective starting area.

18. The motor vehicle roof as in claim 7, wherein the second roof-mounted guide channel and the third roof-mounted guide channel are made essentially S-shaped in a respective starting area.

19. The motor vehicle roof as in claim 8, wherein the second roof-mounted guide channel and the third roof-mounted guide channel are made essentially S-shaped in a respective starting area.

20. The motor vehicle roof as in claim 9, wherein the second roof-mounted guide channel and the third roof-mounted guide channel are made essentially S-shaped in a respective starting area.

* * * * *